Jan. 24, 1967  N. W. MIZELLE  3,300,243
RECLINING CHAIR FIXTURE
Filed Nov. 13, 1964  7 Sheets-Sheet 1

INVENTOR.
NED W. MIZELLE
BY
Browne, Schuyler and Beveridge
ATTORNEYS

INVENTOR.
NED W. MIZELLE
ATTORNEYS

INVENTOR.
NED W. MIZELLE

United States Patent Office 3,300,243
Patented Jan. 24, 1967

3,300,243
RECLINING CHAIR FIXTURE
Ned W. Mizelle, 902 Sedgewick Lane,
High Point, N.C. 27260
Filed Nov. 13, 1964, Ser. No. 412,585
23 Claims. (Cl. 297—85)

This is a continuation-in-part application of my copending application Serial No. 352,574, filed March 14, 1964, now abandoned.

This invention relates to an improved reclining chair fixture and particularly to a three-way, three-position TV lounger. The term three-way refers to a chain in which the back rest, the seat and an extendible leg rest are each individually pivotally supported for constrained movement relative to the base of the chair and each other. The term three-position refers to the three general positions in which the basic chair components may be positioned: (1) an upright normal position in which the seat and back are angularly disposed relative to each other to subtend a normal upright seating angle and the back and seat, as a unit, are in an upright position relative to the chair base with the leg rest platform retracted into the chair base, (2) an intermediate "TV viewing" position in which the back and seat remain angularly disposed relative to each other to subtend the normal upright seating angle but the seat and back together are tilted slightly rearwardly from the normal upright position and the leg rest is extended in front of and substantially in line with the seat in a leg supporting position, and (3) a fully reclined position in which the back is tilted rearwardly relative to the seat to subtend a relatively large obtuse angle with the seat and the seat reclined rearwardly at a somewhat greater angle than in the intermediate position with the leg rest remaining in an extended leg supporting position generally in line with and in front of the seat.

Such chairs have become increasingly popular in recent years. The occupant of the chair adjusts it to the position which he desires by pressing rearwardly in the seat by applying pressure on the arm rests which forces the seat and back rearwardly on the base and slightly reclines the seat and back unit while the seat motion drives the leg rest forward from a nesting position in the base to the forward leg supporting position. In the intermediate position the occupant's body position is generally erect facing forwardly and slightly reclined with his legs extending horizontally ahead and resting on the leg rest. By further rearward pressure on the seat, the occupant can cause the back to tilt rearwardly relative to the seat to subtend a relatively large angle between the seat and back and also to tilt the seat and leg rest upwardly to the fully reclined position in which the occupant is in a supine, upwardly facing position with his legs supported on the leg rest in line with and ahead of the seat.

There are two widely used leg rest arrangements, in the first of which the leg rest is pivoted from the extended horizontal position through approximately 90° to a vertical position forming the bottom front face of the chair base, and in the second of which the leg rest is pivoted from the extended horizontal position approximately 180° to lie under the bottom of the chair. The latter type of leg rest is commonly known as the "high leg type" in which there is a substantial clearance provided between the floor and the bottom of the chair. Obviously, in the type wherein the leg rest is retracted 90° to form the front face of the chair bottom, little clearance exists between the floor and the bottom of the chair.

Three-way, three-position lounger chairs of these general types are common. However, chair fixtures utilized to support the seat, back and leg rest and provide the motion are most usually designed to operate with two separate and distinct phases of motion of the linkages in which the first phase involves motion between the upright and the intermediate positions and the second phase involves motion between the intermediate and fully reclined positions. The required movement in each of the two phases is accomplished by utilizing a system of stops which block relative motion between certain pivoting links of the fixture during one or the other phases of motion of the fixture. The employment of stops and the two distinct phases of motion are undesirable inasmuch as the stops exactly establish the intermediate position of the chair and the relative position of the leg rest. The intermediate position of the chair for one person, and particularly the position of the leg rest, is not necessarily the most comfortable position for everyone. Furthermore, the linkage arrangement involving link blocking stops does not provide a smooth transition of motion between the two phases and a distinct discontinuity is apparent to the occupant of the chair when passing from phase one to phase two. A noticeable change in force is required in carrying the chair through the intermediate to the reclining positions in some linkage arrangements.

Accordingly, it is an object of this invention to provide a three-way, three-position lounger chair fixture employing simple and continuous pivotal connections between the back, seat and leg rest links through the full range of operation of the chair.

Another object is to provide a three-way, three-position lounger chair fixture employing a continuously pivoting constrained link arrangement in which no intermediate position mechanical link stops are utilized.

Another object is to provide a three-way, three-position lounger chair fixture wherein the intermediate position of the chair is established through an indefinite range by equilibrium between the weight of the chair occupant on the seat and the force exerted by the occupant on the leg rest.

Still yet another object is to provide a three-way, three-position lounger chair fixture employing stopless, continuously pivoting link connections in which the back rest cannot be pivoted relative to the seat until the chair has reached the intermediate semi-reclining position.

A further object is to provide a versatile basic constrained linkage arrangement for a three-way, three-position lounger chair fixture capable of supporting both 90° nesting or 180° pivoting high leg type leg rests of various types.

The foregoing and other objects are achieved in a fixture in which a seat link member attached to the seat is supported for swinging pivotal movement with respect to a fixed base member by a system of constrained pivotal links connecting the respective front and rear end portions of the seat link member and base member of which one of the pivotal link connections is a compound link system with a constraining link pivotally connected to the compound link system. The leg rest is pivotally supported by a system of extendible supporting links which are connected between links pivotally supporting the seat link member on the base member and one of the members which extend and retract the leg rest on relative motion between the seat link and base members. A back link attached to the back is pivotally hinged to the rear of the seat link member and an extensible link arrangement pivotally connects the back link, the seat link member and the base member to cause the seat link member to move laterally with respect to the base member when the back is rotated about the seat when the fixture is between the intermediate and fully reclined positions.

Other objects and features of the invention will be apparent by reference to the following description which is illustrated by the attached drawings in which.

*General*

Figure 1:
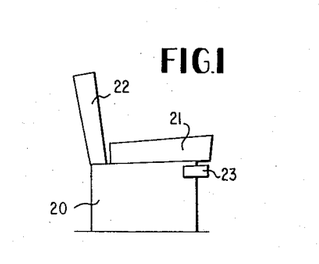
FIGURES 1–3 are schematic side elevation views of the chair showing the major elements of the chair in their respective positions in each of the three chair positions.
Figure 2:
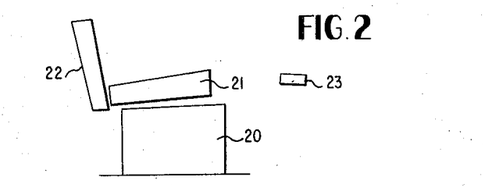
Figure 3:
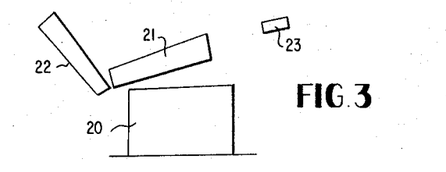

In FIGURE 1 the chair, comprising a base 20, a seat 21, a back 22 and a leg rest 23 is shown in the normal upright position with the back 22 and seat 21 angularly disposed relative to each other at a comfortable seating angle with the seat and back unit positioned in a generally upright position relative to the base 20 and the foot rest 23 retracted into the chair. FIGURE 2 illustrates the chair in an intermediate position in which the angle between the back 22 and seat 21 remains unchanged but the seat and back as a unit are swung rearwardly and upwardly relative to the base 20 so that the front of the seat 21 is slightly elevated with the leg rest 23 positioned ahead of and substantially in line with the seat 21 to place the unit in a partially reclined position. FIGURE 3 illustrates the chair in the fully reclined position in which the back 22 is tilted rearwardly on the seat 21 in a manner to subtend between them an angle substantially greater than in the normal position and the unit is reclined with the seat swung further rearwardly and seat front elevated more than in the intermediate position with the leg rest 23 retained in a position generally in line with and in front of the seat. Thus it can be seen that in the position illustrated in FIGURE 1 the chair occupant is sitting in the normal upright, forward facing position with his feet on the floor and the leg rest retracted. In the intermediate position of FIGURE 2 the occupant faces substantially forward in a position to view a television screen or converse with other persons but with his legs extending forwardly to rest on the leg rest. In a fully reclined position illustrated in FIGURE 3, the chair occupant is in a fully reclined position on his back in a supine position facing generally upwardly toward the ceiling with his legs extending forwardly and resting on the leg rest.

*Embodiment of FIGURES 4–10*

Figure 4:
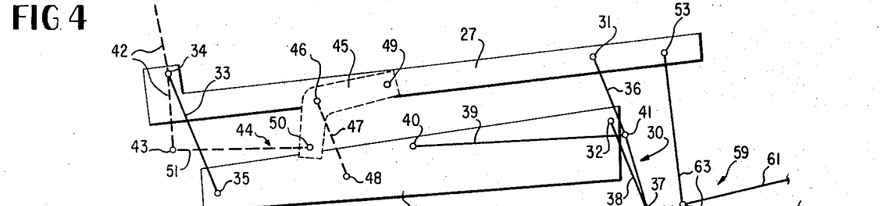
FIGURE 4 is a schematic partial side elevation of one embodiment of the chair fixture illustrating the position of the linkages when the chair is positioned intermediate the upright and intermediate positions.
Figure 5:
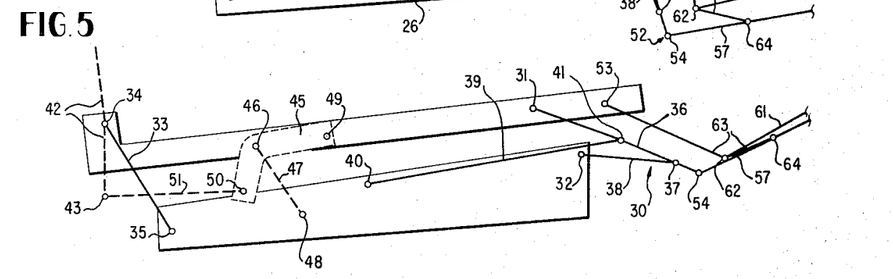
FIGURE 5 is the schematic arrangement of FIGURE 4 illustrating the position of the linkages in the intermediate chair position.
Figure 6:
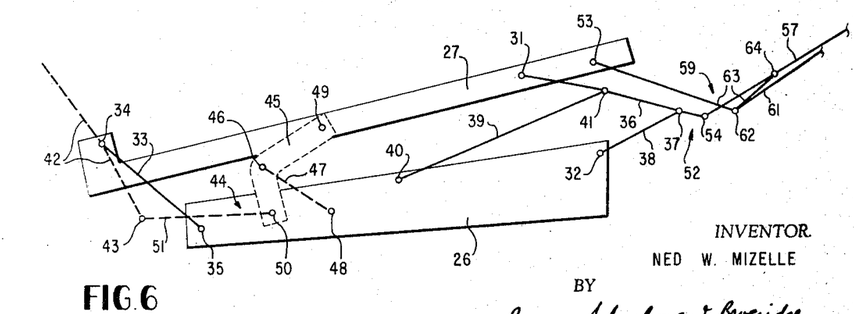
FIGURE 6 is the schematic arrangement of FIGURE 4 illustrating the position of the linkages when the chair is in the fully reclined position.

The first embodiment of the invention is illustrated in FIGURES 4–10. FIGURES 4–6 represent a schematic embodiment of the invention illustrated in FIGURES 7–10 but with some of the leg rest arrangement omitted for purposes of simplification. In the schematic arrangement shown in FIGURES 4–6, the structural elements associated with moving the back and seat between the intermediate and the fully reclined position are indicated in dashed lines to simplify an understanding of the description.

Figure 7:
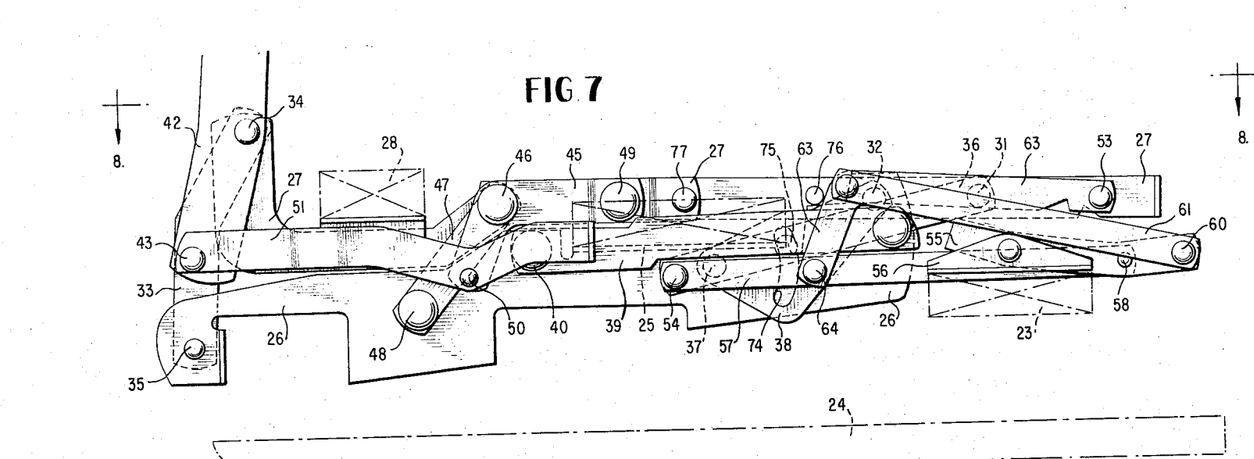
FIGURE 7 is a side elevation of a high leg fixture conforming to the embodiment illustrated schematically in FIGURE 4 with the links arranged in the normal upright chair position with the leg rest fully retracted.
Figure 8:
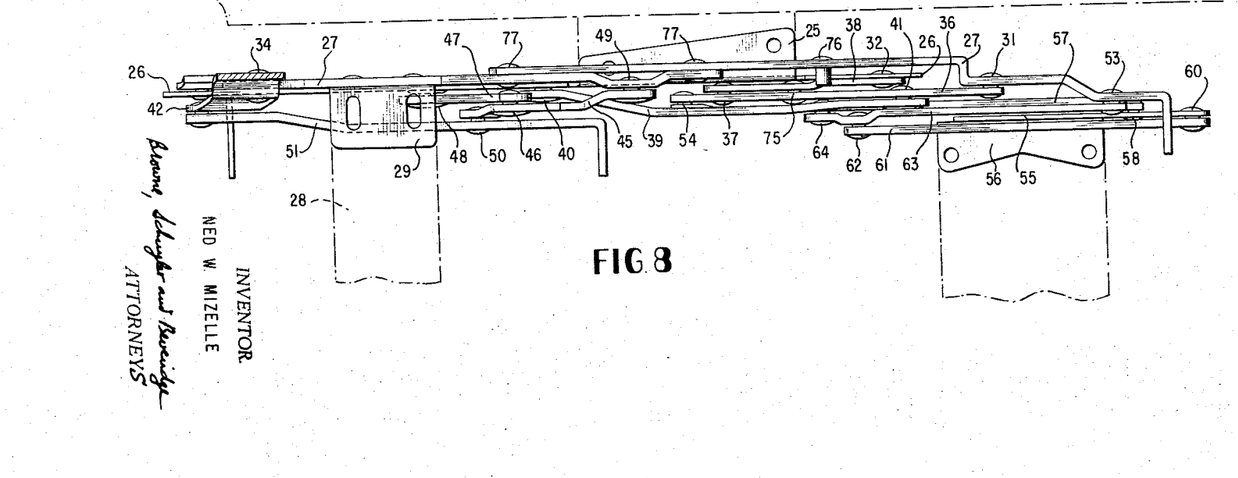
FIGURE 8 is a plan view from above of the fixture in FIGURE 7 taken at line 8—8 of FIGURE 7.

As is conventional, the back, seat and leg rest are mounted on two fixtures which are each affixed to the basic chair frame, one fixture being mounted on each side of the chair to extend along the side of the seat. Since these two fixtures differ only in being right handed or left handed, only one fixture is described and illustrated, being that one mounted on the left side of the chair. As best seen in FIGURES 7–10, the fixture is affixed to a structural member 24 of the chair base 20 by bolting the structural member to a support plate 25 which extends horizontally from a fixed base member 26 of the fixture. The base member 26 has suitable cutouts, as illustrated in FIGURE 7, to accommodate transversely extending structural members. A seat link member 27, pivotally connected to the base member 26 as hereinafter described in more detail, is adapted for attachment to the seat 20 by such members as the flange 29 riveted to the seat link member with the flange being affixed to a seat structural member 28. It should be understood that these structural attachments to the fixtures are partial examples only and that other structural supports for the fixture are involved.

The seat link member illustrated is formed by joining two portions by rivets 77 and has a short stud 76 extending downwardly from its side in its forward end portion. The seat link member 27 is pivotally mounted to swing upwardly and lengthwise of the base member 26 by means of pivoting links connected between the front and rear portions, respectively, of the seat link member and base member. A front support linkage means 30 is pivotally connected at its opposite ends to a front seat pivot 31 near the front of the seat link member and to a first fixed pivot 32 at the front of base member 26. A rear support linkage means comprises link 33 which is pivotally connected at its ends to a rear seat pivot 34 near the rear of the seat link member and to a second fixed pivot 35 near the rear of base member. The front seat support linkage means includes two pivotally connected links, a first front support link 36 pivotally connected at one end to front seat pivot 31 and a second front support link 38 which is pivotally connected at one end to the other end of the first support link 36 by pivot 37 and at the other end to the first fixed pivot 32 of the base member 26. A constraining link means comprising the link 39 is pivotally connected at one end by means of pivot 40 to the base member 26 intermediate its ends and at the other end to an intermediate point of the first front support link 36 at pivot 41. The second front support link 38 is roughly triangular in plan form and has a transverse slot 74 into which slidingly fits a stud 75 extending from the side of the central area of the first front support link 36.

A back link 42, which is adapted to be affixed to the back 22 by suitable attaching means, is pivotally mounted between its ends to the seat link member 27 at the rear seat pivot 34. Mounting the back link at the rear seat pivot 34 in this embodiment is a convenient expedient and it should be understood that the back link may be pivotally mounted on the seat link 27 at a point other than that where the rear seat support link 33 is pivotally connected at the rear seat pivot 34. The lower end of the back link 42 is pivotally connected by pivot 43 to an extensible link means 44 which is a compound linkage arrangement having pivotal connections also to the base member 28 and the seat link member 27 for raising the front portion of the seat link member relative to the base member when the back link 42 is pivoted about the rear seat pivot 34. The extensible link means 44 comprises a bell crank 45 pivotally connected at its fulcrum by pivot 46 to the base member 26 by means of the link 47 which is pivotally connected at one end to pivot 46 on the bell crank and at the other end to the base member 26 by pivot 48. One end of the bell crank 45 has a pivotal connection 49 to the seat link member 27 intermediate its ends. The other end of the bell crank is connected by pivot 50 to one end of a link 51 which is pivotally connected at the other end to the pivot 43 at the lower end of the back link 42. As previously noted, the structural elements of the back link 42, bell crank 45 and links 47 and 51 associated with the back link pivotal motion are shown in dashed lines in FIGURES 4–6 to emphasize the two connecting link systems.

Referring now to FIGURES 7–10 for a description of the structure for supporting the leg rest 23, the leg rest is pivotally supported by a leg rest supporting link means 52 which pivotally connects at one end to the front end of seat link member 27 at pivot 53 and at the other end to the outer end of the first front seat support link 36 at pivot 54 for movement between its extended and retracted positions along with the movement of the seat link member 27 and front seat support link means 30. The leg rest supporting link means comprises a leg rest link 55 adapted for being affixed by means of the flange plate 56 to the leg rest 23, a first leg rest extension link 57 pivotally connected at one end to the leg rest support link 55 at pivot 58 and at the other end to the pivot 54 at the outer end of the first seat support link 36, and a second leg rest extension link means 59 pivotally connected between one end of the leg rest support link 55 at pivot 60 and pivot 53 at the front end of the seat link member 27. The second leg rest extension link means comprises the third leg rest extension link 61 pivotally connected at one end to the pivot 60 at the end of the root rest link 55 and at the other end to the pivot 62 at the apex of an L-shaped fourth leg rest extension link 63 which is connected at one end to the pivot 53 on the front end of the seat link member 27 and at the other end to pivot 64 located intermediate the ends of the first leg rest extension link 57.

Insofar as the operation of the embodiment shown in FIGURES 7–10 is concerned, this is most easily followed by referring to FIGURES 4–6 along with FIGURES 7–10. FIGURE 7 shows the fixture link positions when the chair is in the normal upright position. The seat link member 27 is in its forwardmost position with the stop 76 resting on the top of the base member 26 to establish the most forward position of the seat link member. The top surface of the foot rest 23 attached to the flange 56 of the foot rest link 55 is facing downwardly with the leg rest supporting link means 52 folded rearwardly to nest alongside the front portions of the seat link member 27 and the base member 26. The back link 42 is at an angular position relative to the seat link which conforms to the normal upright angular relationship illustrated in FIGURE 7 and the bell crank 45 of the extensible link means 44 is positioned in its uppermost position relative to the seat link 26. It should be noted that the constraining link 39 lies below the first fixed pivot 32 on the base member 26 when the chair is in the range from the upright to the intermediate positions. Therefore, the back link 42 cannot be pivoted about its pivot point 34 to raise the seat by the pivoting motion of the bell crank 45 about its fulcrum pivot 46 since the constraining link 39 is on the lower side of the dead center point of the first fixed pivot 32 and the motion of the seat is restricted to translational motion relative to the base. When the constraining link 39 passes to above the first fixed pivot 32 on the base member 26, the forward portion of the seat link member 27 may pivot upwardly to move laterally with respect to the base member 26.

Figure 9:
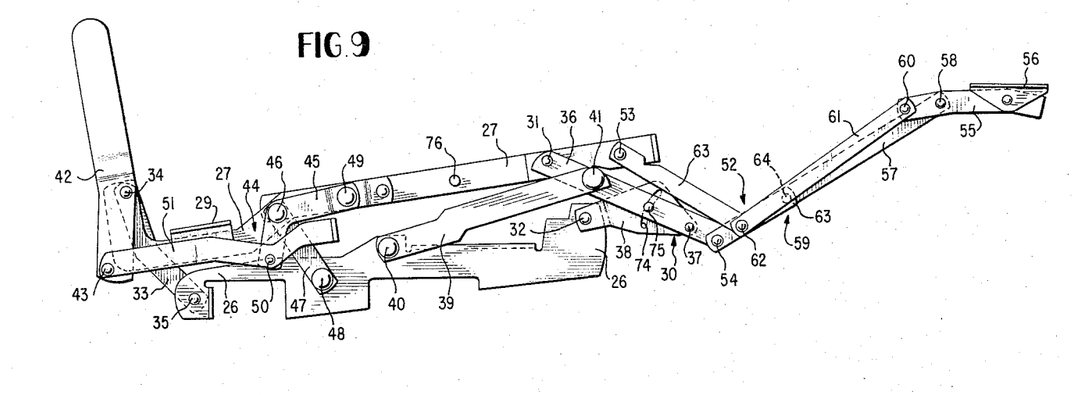
FIGURE 9 is a side elevation of the fixture illustrated in FIGURE 7 with the links in the intermediate chair position with the leg rest extended.

When the chair occupant exerts rearward pressure on the seat and seat link member 27, the seat link member swings upwardly and rearwardly about the rear support link 33 and the front support linkage means 30 in a general translational movement relative to the base member. The back link 42 cannot pivot relative to the seat link 27, even though considerable pressure is exerted against the back of the seat, due to the overcenter position of the constraining link 39 as previously discussed. The seat link member 27 continues to swing upwardly and rearwardly in a general translational movement with the rear support link 33 and the bell crank supporting link 47 pivoting rearwardly and the front support links 36 and 38 and the constraining link 39 pivoting upwardly through the position indicated in FIGURE 4 and slightly raise the front of the seat link member 27 relative to the base member 26. The pivoting motion of the first seat support link 36 swings the first leg extension link 57 forwardly carrying with it the leg rest extension linkages 52, which are pivoted about the front of the seat link member 27 at pivot 53, to swing the leg rest assembly forwardly of the seat link member 27 as illustrated in FIGURES 4 and 9. The forward pivoting motion of the first leg rest extension link 57, attached to the intermediate pivot 58 on the foot rest link 55, swings the foot rest link 55 about its end pivot 60 through approximately 180° so that the flange 56, to which the root rest 23 is affixed, faces upwardly in front of and approximately in line with the seat 22 when the constraining link 39 is in the vicinity of the first fixed pivot 32, at which time the links of the leg rest extension link means are substantially fully extended and the fixture is in the intermediate position. An equilibrium condition is established at the intermediate position by the counteracting forces of the weight of the occupant on the seat and the weight of the occupant's legs on the leg rest. The intermediate position is, therefore, not an exact position but is a range of positions of the links when the restraining link is in the vicinity of or slightly above the first fixed pivot 32 with the leg rest upright and in a forward leg supporting position as illustrated in FIGURE 9.

Figure 10:
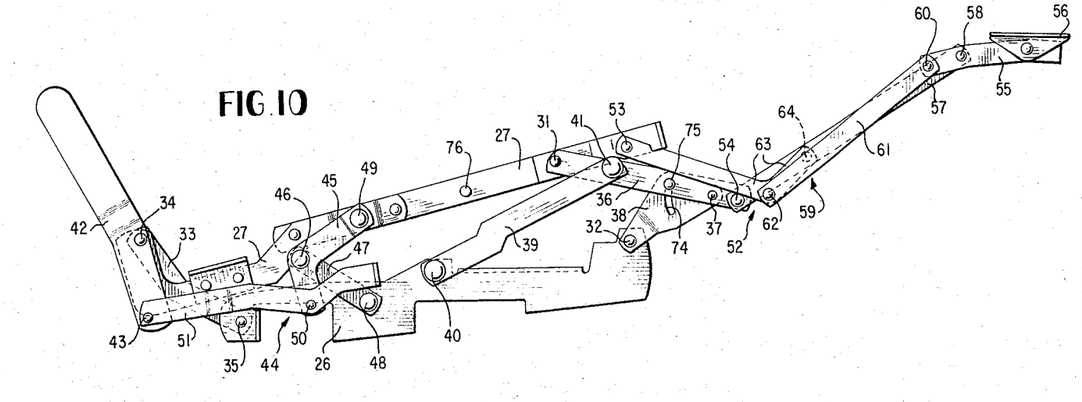
FIGURE 10 is a side elevation of the fixture illustrated in FIGURE 7 with the links in the fully reclined chair position.

After the constrained linkage of the fixture reaches the equilibrium position and the constraining link 39 passes above the first fixed pivot 32 of the base member, the front of the seat link member 27 may be pivoted about its rear pivots to move laterally with respect to the base member and raise the front edge of the seat upwardly from the base member. If pressure is exerted on the back link 42 at this time, the back link will pivot about the rear seat pivot 34 reclining the back 22 relative to the seat 21. At the same time, the pivoting motion of the back link 42 moves the link 51 joining the lower portion of the bell crank 45 forwardly and causes the bell crank, pivotally mounted to the base member 26 by the link 47, to rotate relative to the base about its fulcrum pivot 46 so that the upper end of the bell crank, which is pivotally connected by pivot 49 to the seat link member 27, is moved upwardly relative to the base member 26, thereby causing the forward portion of the seat link member to move laterally about its rear pivots relative to the base member to the position illustrated in FIGURES 6 and 10, the fully reclined chair position. The stop 75 on the first front support link 36, which is riding in the slot 74 in the second front support link 38, strikes the upper end of the slot 74 to lock the seat link member 27 at its maximum point of elevation and establish the terminus of the fully reclined position. As illustrated in FIGURE 10, the leg rest and its extended supporting links are carried upwardly substantially in line with the seat by the upward motion of the seat link member 27 and the first seat support link means 30 in moving from the intermediate to the fully reclined positions.

Moving the chair from the fully reclined position to the intermediate and upright positions is carried out by reversing the processes and motions previously described. The motion of the seat link member 27 is essentially translational relative to the base member 26 during the motion between the upright and the intermediate positions but, upon the restraining link 39 passing to above the first fixed pivot 32, the seat link member motion changes to a more rotational one about its rear pivot points and the front of the seat link member is moved laterally relative to the base member. However, at no time in the motion of the links during their full range of operation between the fully reclined and the upright positions, is there any discontinuity of the motion with any stops blocking links from further motion.

Figures 11, 12, 13:
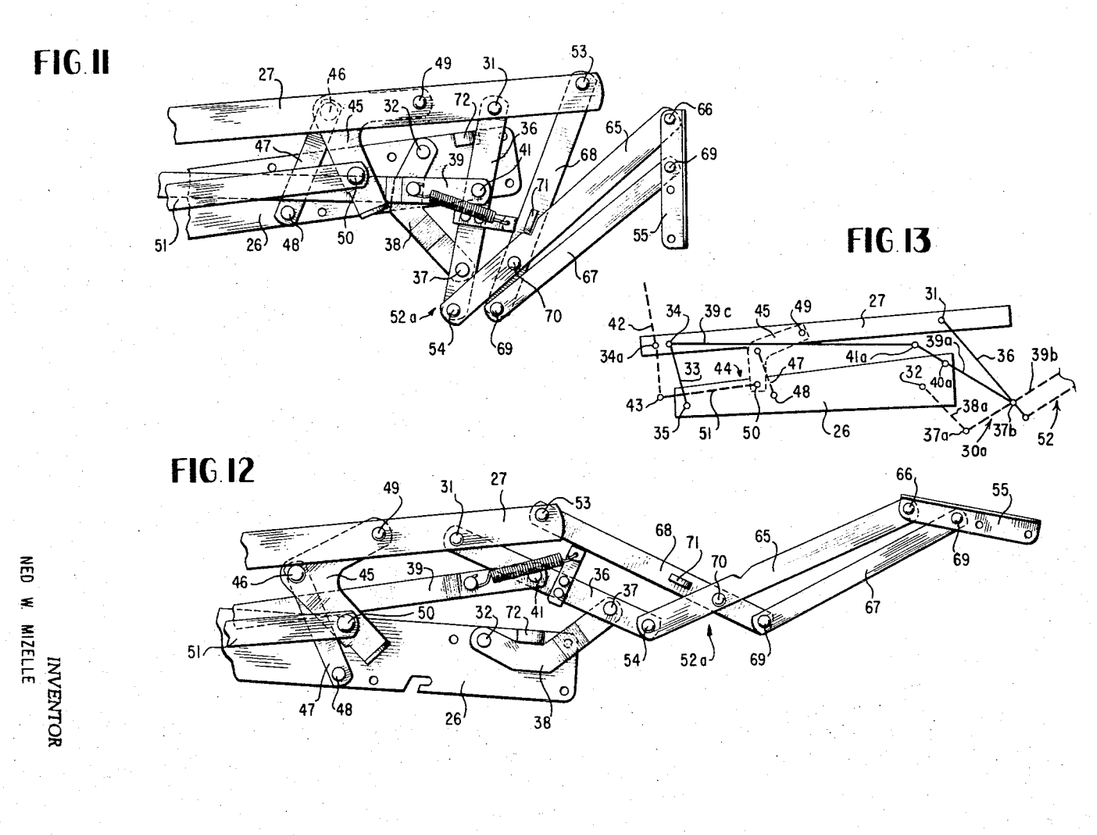
FIGURE 11 is a partial side elevation illustrating an embodiment in which the high leg rest type leg rest links of FIGURE 9 are replaced by a link system for the front nesting 90° type, the links being in the upright normal chair position.
FIGURE 12 is a partial side elevation similar to FIGURE 11 with the links in the fully reclined chair position.
FIGURE 13 is a partial schematic side elevation of another embodiment of the constraining linkage arrangement.
Figure 14:
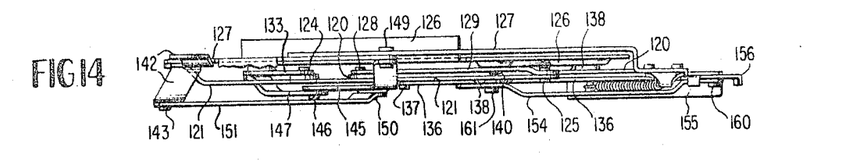
FIGURE 14 is a plan view from above of a second embodiment of the fixture with the links retracted when the chair is in the normal upright position.

*Embodiment of FIGURES 11–12*

Refer now to FIGURES 11 and 12 for a brief description of the leg rest supporting link means 52a for the 90° pivoting low clearance leg rest arrangement. The leg rest supporting link means 52a, pivotally connected between the pivot 53 at the front end of the seat link member 27 and the pivot 54 at the lower end of the first front support link 36, comprises the tong arrangement of a first leg rest link 65 pivotally connected at one end to pivot 54 at the outer end of the first front support link 36 and at the other end to the pivot 66 at the front of the leg rest link 55, and the leg rest support links 67 and 68 which are pivotally connected together at one of their ends by pivot 69 with the other two ends connected to the leg rest link 55 at pivot 69 and to the front end of the seat link member 27 at pivot 53, the links 65 and 68 being pivotally connected intermediate their ends at pivot point 70. A projecting stop 71 is installed on the link 68 intermediate its ends and the base member 26 likewise has a raised stop projection 72 slightly above and forward of the first fixed pivot 32 The second front support link 38 in this embodiment is in the form of a generally C-shaped link instead of the first triangularly shaped link 36 in the prior embodiment.

Some of the links and members, such as the constraining link 39 and the seat link member 26, are formed to have an irregular shape along their length to provide the necessary clearance between links and to provide a compact fixture arrangement in the retracted position. The irregular shape along the length of the links can be seen best in FIGURE 8.

The operation of the 90° low clearance leg rest embodiment of FIGURES 11 and 12 is quite similar to that of the previously described high leg rest type but is obviously much more restricted in its range of motion. The leg rest link 55 and leg rest 23 in the retracted position is vertical and faces forwardly as illustrated in FIGURE 11. The projection 71 on the leg rest support link 68 contacting the leg rest support link 65 stops the links from further retracted motion and establishes the terminus of the retracted position of the fixture in the normal upright chair position. The unmarked spring connecting the constraining link 39 and the first front support link 36 serves only to assist maintaining the linkage in the retracted position. The first front support link 36 in swinging upwardly when the seat link is swung rearwardly, causes the foot rest link 55 to swing forwardly through about a 90° angle to a position in front of and generally in line with the seat link member 27 by the action of the pantograph linkage arrangement of the four links 36, 68, 65 and 67 connected to the leg rest link 55. The leg rest link 55 is substantially fully extended when the constraining link 39 passes over the dead center point of the first front pivot 32, as in the high leg rest embodiment, and remains in essentially the same position relative to the leg rest link 27 as the fixture is tilted from the intermediate to the fully reclined position. The stop 72 on the base member 26 striking the forward edge of the second front support link 38 establishes the maximum degree of pivotal motion of the seat link member 27 at the terminus of the reclining chair position.

*Embodiment of FIGURE 13*

The constrained linkage structure described so far is, in general, the same for the high leg rest embodiment illustrated in FIGURES 4–10 and the 90° pivoting front nesting leg rest embodiment illustrated in FIGURES 11 and 12. However, a variation of this constrained linkage arrangement is illustrated schematically in FIGURE 13. In this embodiment, in which the same reference numerals are utilized as in the previously described embodiment when the structure is essentially the same, the seat link member 27 is swingably pivoted at both ends to the base member 26 by front seat support link means 30a pivotally connected at each end to the front seat pivot 31 and the first fixed pivot 32 of the base member and by a rear seat support link 33 pivotally connected at each end to the rear seat pivot 34 and the second fixed pivot 35 at the rear of the base member 26 in the same general manner as in the prior described embodiment. However, the front support link means comprises the first front support link 36 pivotally connected at one end to the first seat pivot 31 and a second front support link 38a which is pivotally connected at one end to the first fixed pivot 32 but having its other end pivotally connected at 37a to a front control link 39b which in turn pivotally connects at 37b to the other end of the first front support link 36. The constraining linkage means, instead of being a single link pivotally connected at its ends between the base member 26 and the first front support link 36 as in the previously described embodiment, comprises the constraining link 39a and the front and rear control links 39b and 39c. The constraining link 39a is pivotally mounted intermediate its ends on the base member 26 at pivot 40a. One end of the constraining link is pivotally connected by pivot 41a to a rear control link 39c having its other end pivotally connected to the seat link member at pivot 34 where the rear support link 33 is also pivoted. Again the dual pivoting position is a matter of convenience. The other end of the constraining link 39a is pivotally connected at 37b to a front control link 39b which in turn is pivotally connected between the first and second front support links 36 and 38a at the pivots 37b and 37a. The remaining structure of the pivotally mounted back link 42 and the extensible link means 44 is essentially the same as in the subsequently described 90° pivotally low clearance leg rest arrangement except that the back link 42 is pivoted on the seat link member 27 at a separate pivot 34a. The above described constrained linkage arrangement for swingably supporting the seat link member 27 is essentially the same linkage arrangement as is disclosed in the applicant's United States Patent 3,190,690. The leg rest support link 52, to which the extendible leg rest is connected, is not illustrated but, in this particular embodiment would be the 90° leg rest illustrated in FIGURES 11–12. A high leg rest arrangement similar to that of FIGURES 7–10 could also be utilized particularly by the arrangement shown in FIGURES 14–21 subsequently described.

The operation of the schematic embodiment illustrated in FIGURE 13 is generally the same as described for the previous embodiments except that the constraining link 39a reaches dead center to permit the back rest to be pivoted about the seat link member 27 after the pivot point passes below the line joining the constraining link pivot 40a on the base member and the rear seat pivot 34 on the seat link member 27. Once the fixture has reached the intermediate position with the front control link 39c being able to rotate clockwise about the pivot point 34 while the constraining link rotates counterclockwise, the back link 42 may be pivoted about pivot 34a on the seat link member 27 and the seat link member 27 is pivoted laterally relative to the base member 26 by the pivoting motion of the bell crank 45 actuated by the link 51 connected to the lower end of the back link 42 as previously described for the embodiment of FIGURES 7–10.

*Embodiment of FIGURES 14–21*

The embodiment of FIGURES 14–21 illustrates another version of the three-position chair fixture generally patterned after the type of restraining linkage arrangement schematically illustrated in FIGURE 13 in which a constraining link, pivotally mounted intermediate its ends to the base member, controls the movement of the seat link member through two control links connected, respectively, to the front support linkage means and to the seat link member. A considerable portion of the fixture in the embodiment of FIGURES 14–21 is similar to the fixture described by the applicant in his U.S. Patent 3,114,573 with the constraining linkage arrangement and the leg rest support link arrangements being of the same type as in the aforementioned patent. However, the fixture illustrated in FIGURES 14–21, unlike Patent 3,114,573, has provisions permitting the back link to pivot about the seat link and has means for pivotally connecting a bell crank between the back link, seat link member and a base member to laterally move the seat link member relative to the base member when the back link is pivoted from the intermediate, or semi-reclined position to the fully reclined position.

The actual fixture is illustrated in FIGURES 14–18 and, as in the case of the previously described embodiment, is the left-hand one of two fixtures mounted to the chair base 20 on opposite sides of the chair. The base member 126 is adapted for attachment to the base 20 by suitable fixtures, not illustrated. A seat link member 127, pivotally connected to the base member 126, as hereafter described in more detail, is adapted for attachment to the seat 20 by suitable fixtures, not illustrated.

The seat link member 127 is pivotally mounted to swing upwardly and longitudinally of the base member 126 through pivotable links pivotally connected between the front and rear portions, respectively, of the seat link member 127 and base member 126. The first of these link systems for supporting the seat link member, a front support linkage means 130, is pivotally connected at its opposite ends to a front seat pivot 131 adjacent the front of the seat link member 127 and to a first fixed pivot 132 near the front portion of the base member 126. The front seat support linkage means 130 comprises two pivotally connected links, a first front support link 136 pivotally connected at one end to front seat pivot 131 and a second front support link 138 which is pivotally connected at one end to the other end of the first support link 136 by a pivot 137 and at the other end to the first fixed pivot 132 of the base member 126.

A constraining linkage means 139, which pivotally interconnects a central portion of the front support link means 130 and the rear portion of the seat link member 127, to provide a constrained pivotal, swinging relationship of the seat link member relative to the base member, comprises the constraining link 129, which is pivotally connected intermediate its ends to the base member 126 at pivot 140, and has its two ends pivotally connected, respectively, to one end of a forward control link 120 at pivot 128 and to one end of a rear control link 121 at pivot 125. The other end of the rear control link 121 is pivotally connected to the rear of the seat link member 127 at the rear seat pivot 134. The other end of the front control link 120 pivotally connects to the leg rest 155 with an intermediate point on the forward control link being pivotally connected to the second front support link 138 at pivot 141.

The rear support linkage means, which is the second of the link system for pivotally and swingably connecting the seat link member 127 to the base member 126, comprises the rear support link 133 having one end pivotally connected to the base member 126 at pivot 135 and the other end pivotally connected to the rear control link 121 at pivot 124 near the rear end portion of the seat link 127. Thus, in this embodiment, the rear support link 133 interconnects the seat link member and base member via the rear control link 121 instead of the direct connection utilized in the embodiment of FIGURES 7–10.

The extensible link means 144 of this embodiment is very similar to that of the previously described ones and comprises a bell crank 145 having a pivotal connection at its fulcrum 146 to the base member 126 through the link 147 which is pivotally connected at one end to the bell crank fulcrum 146 and at the other end to the member 126 at the second fixed pivot 135. Connecting the link 147 to the base member at the second fixed pivot 135 is a matter of expediency and the link 147 could be pivotally connected to the base member independently at a separate pivot from that of the second fixed pivot 135. One end of the bell crank 145 is connected to the seat link member 127 intermediate its ends at the pivot connection 149. The other end of the bell crank 145 is connected at pivot 150 to one end of a link 151 which is pivotally connected at the other end to the lower end of the back link 142 at the pivot 143.

Figure 18:
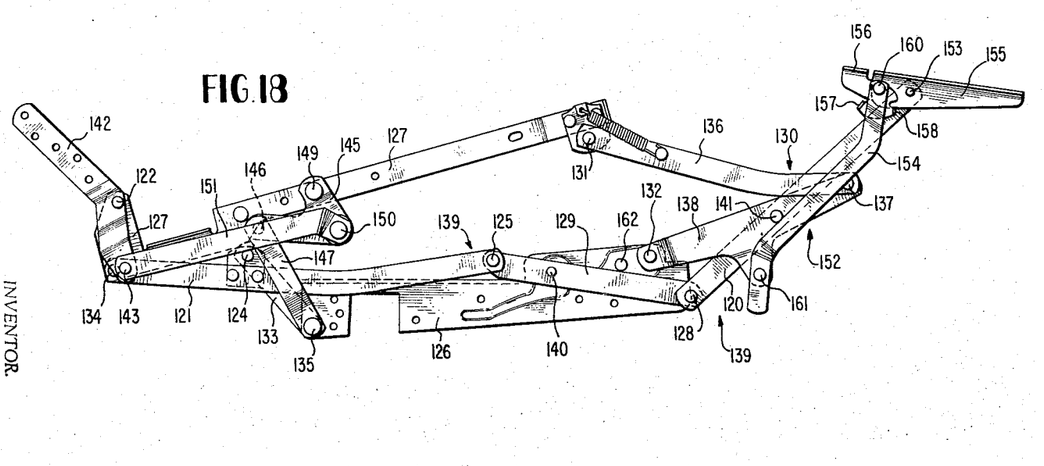
FIGURE 18 is a view similar to FIGURE 17 but with the links positioned as when the chair is in the fully reclined position.
Figure 19:
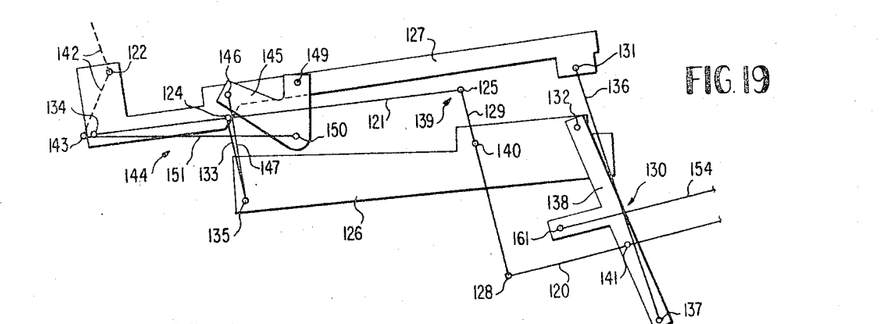
FIGURES 19–21 are schematic arrangements of the links with the links in the positions corresponding to FIGURES 16–18.
Figure 20:
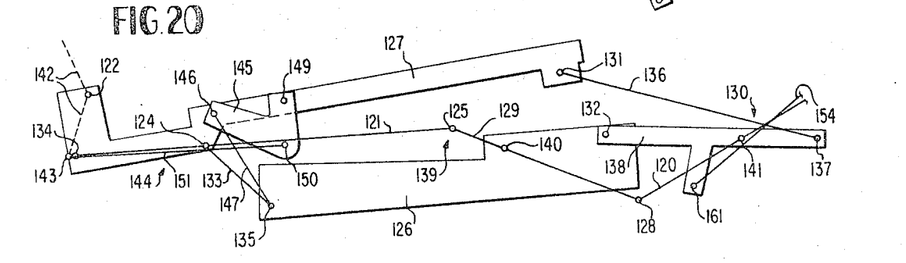
Figure 21:
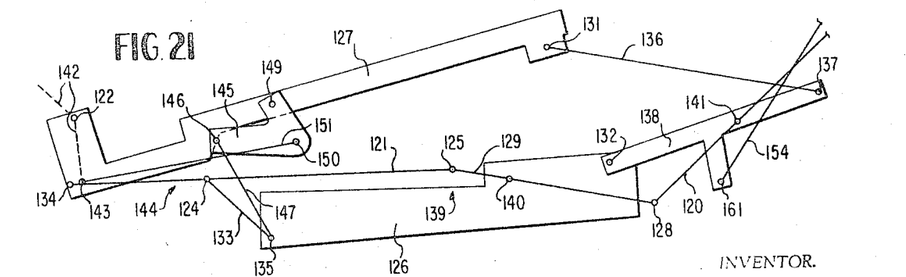

The leg rest link 155, affixed to the leg rest 23, is pivotally supported by the front control link 120 and a leg rest supporting link means 152 for movement of the leg rest between its extended and retracted positions concurrent with the movement of the seat link member 127, the front control link 120 and the front seat support link means 130 relative to the base member 126. The leg rest link 155 has an auxiliary leg rest link 156 pivotally connected to one end at pivot 160. The function and interrelationship of the leg rest link 155 and auxiliary leg rest link 156, which also includes the tabs 157 and 158 controlling the relationship between the two leg rest links, is as described in U.S. Patent 3,114,573 with particular references to FIGURES 7–9 of that patent. The leg rest link 155 is pivotally connected to the base member 126 and to the first and second front support links 136 and 138 by the leg rest supporting link means 152, which includes the control link 120 having the far end connected to the leg rest link 155 at pivot 153 and the leg rest pivoting link 154 one end pivotally connected to the leg rest link 155 at pivot 160 and the other end pivotally connected to an intermediate point of the second front support link 138 at pivot 161. A pin 162 projecting from the forward portion of the base member 126 acts as a stop which engages the constraining link 129 when the linkage reaches the fully reclined position, as seen in FIGURE 18.

Figures 15, 16:
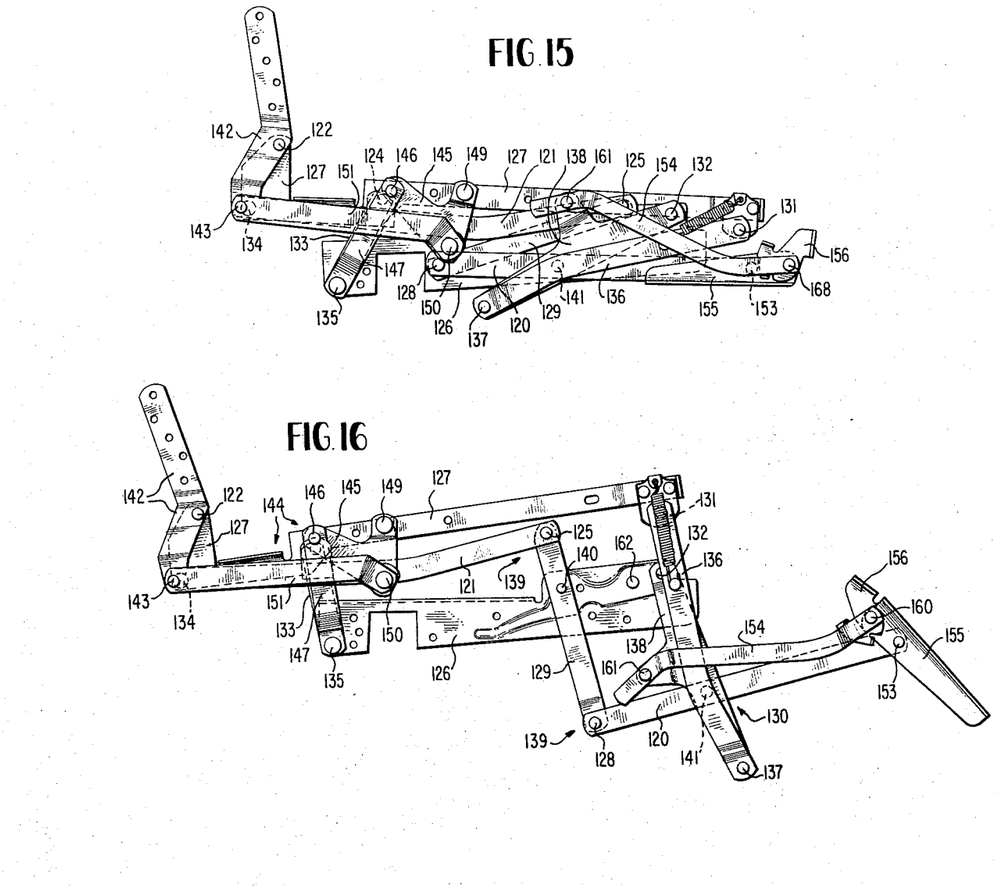
FIGURE 15 is a side elevation of the fixture of FIGURE 14.
FIGURE 16 is a side elevation of the fixture of FIGURE 15 with the links intermediate the retracted position of FIGURE 15 and an extended position when the chair is in the intermediate position.
Figure 17:
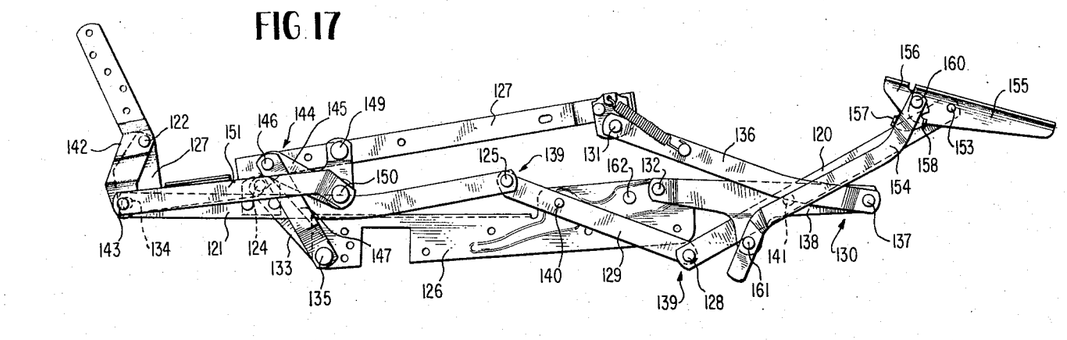
FIGURE 17 is a side elevation of the fixture of FIGURE 15 with the links extended when the chair is in the intermediate position.

The operation of this fixture is generally the same as that for the embodiment described in FIGURES 7–10. When the chair occupant exerts rearward pressure on the seat and seat link member 127, the seat link member swings upwardly and rearwardly about the rear support link 133 and the front support linkage means 130 in a general translational swinging motion relative to the base member 126. The seat member 127 swings upwardly and rearwardly with the front support links 136 and 138, respectively, rotating counterclockwise about the front seat pivot 131 and the first fixed pivot 132 and with the rear support link 133 rotating counterclockwise about the second fixed pivot 135 to the position indicated in FIGURE 19. When the first front support link 136 passes the dead-center position in which it may be rotated about the pivot 137 in a clockwise rotation relative to the second front support link 138 instead of the counterclockwise relative rotation as shown between FIGURES 19 and 20, pressure exerted on the back link 142 will cause the back link 142 to pivot rearwardly relative to the seat link member 127, reclining the back 22 relative to the seat 21. This pivoting motion of the back link 142 moves the link 151 forwardly and causes the bell crank 145 to rotate about its fulcrum 146 counterclockwise relative to the base member 126 while pivoting about the pivotal connection 149 to the seat link member 127 to the fully reclined position illustrated in FIGURE 21. The manner of motion of the leg rest link 155 in moving from the fully retracted position in FIGURE 15 to the intermediate chair position of FIGURE 17 through the intervening position at FIGURE 16 is quite apparent from these figures. Rotation of the constraining link 129 counterclockwise about the base member 126 moves the forward control link 120 and the leg rest link 155 attached thereto from the retracted position of FIGURE 15 forwardly ahead of the base member 126 to a position ahead and generally horizontal with the seat link member 127 in the intermediate position. The leg rest pivoting link 154 connected between the leg rest link 155 and the second front support link 138 shifts the leg rest link 155 through almost 180° relative to the forward control link 120 when the fixture moves from the retracted position of FIGURE 15 to the intermediate position of FIGURE 17. In moving the seat link member 127 generally laterally relative to the base member 126 when the chair is moved from the intermediate chair position to the fully reclined position, the leg rest and its supporting links are carried upwardly substantially in the same horizontal line with the seat upon upward movement of the seat link member 127 in the manner illustrated in FIGURE 18.

It should be apparent that the type of motion of the embodiment of the fixture in FIGURES 14–18 is substantially the same as the type of motion of the fixture illustrated in FIGURES 7–10, i.e., the motion of the seat link member 127 is essentially translational relative to the base member 126 during the motion betwen the upright and intermediate positions but, upon reaching the intermediate position, the seat link member motion changes to a rotational one about its rear pivot points and the seat link member moves generally laterally relative to the base member.

While the above matter describes and illustrates preferred embodiments of the invention, it should be understood that the invention is not restricted solely to the described embodiments but that it covers all modifications which should be apparent to one skilled in the art and which would fall within the scope and spirit of the invention.

What is claimed is:

1. In a reclining chair having a seat, a back and a leg rest supported by a fixture on a stationary base for movement between a normal upright position in which said seat and back are angularly disposed to subtend an upright seating angle with said seat generally horizontal and said leg rest retracted onto said base, a fully reclined position in which said back is reclined rearwardly relative to said seat to subtend a substantially greater angle than said upright seating angle with said seat tilted rearwardly relative to said base and said leg rest extended ahead of and generally in line with said seat in a leg supporting position, and an intermediate position in which said seat and back are angularly disposed to subtend said normal upright seating angle with said seat rearwardly reclined relative to said base at an angle less than in said fully reclined position and said leg rest extended in said leg supporting relationship, said fixture comprising:

a base member affixable to the base,
a seat link member affixable to the seat,
a first front support link pivotally connected at one end to the forward end portion of said seat link,
a second front support link pivotally connected to the front portion of said base and to the other end portion of said first support link,
a constraining link pivotally mounted intermediate its ends on said base member,
a front control link pivotally connected between one end of said constraining link and one of said front support links,
a rear control link pivotally connected between the other end of said constraining link and the rear portion of said seat link member,
a rear support link pivotally connected at one end to said base member and at the other end to said rear control link,
said constraining link and control links establishing a fully constrained, pivotal, swinging motion of said seat link member and continuous pivotal motion of said support links while moving between said normal and fully reclined positions,
a leg rest supporting link means affixed to the leg rest and pivotally connecting said leg rest to one of said front support links and one of said members for movement of said leg rest between said retracted and forward leg supporting positions on relative motion between said front support links and said one member,
a back link affixable to the back and pivotally connected to the rear end portion of said seat link member,
a lever having a fulcrum,
means pivotally connecting said fulcrum with said base member for rotational movement of said lever and said base member,
and means connecting two other points, respectively, on said lever spaced from said fulcrum with said seat link member and with said back link at a point spaced from the pivotal connection between said back link and said seat link member, whereby the movement of said back link relative to said seat link member transmitted through said lever and connecting means pivotally moves said seat link angularly relative to said base member concurrently with the pivoting motion of said back link.

2. The fixture described in claim 1 wherein said lever fulcrum is pivotally connected to one end of a link having its other end pivotally connected to said base member, said seat link member is pivotally connected to one of said two points and said other one of said two points is pivotally connected to one end of a connecting link having its other end pivotally connected to said back link below its pivotal connection to said seat link member.

3. A three-position fixture supporting the seat and back of a reclining chair, said fixture comprising:

a fixed base member adapted for affixing to the base of the chair and having a first fixed pivot and a second fixed pivot,
a seat link member adapted for affixing to the seat and having a front seat pivot and a rear seat pivot,
first and second front support links pivotally connected together near one of their ends and having their other ends pivotally connected to said front seat pivot and to first fixed pivot, respectively,
a rear support link pivotally connected between said second fixed pivot and said rear seat pivot,
a constraining link having one end pivotally connected to said base member and the other to one of said front support links, whereby said support links and said constraining link supportingly swing said seat link member relative to said base member about said pivots between a normal forward generally horizontal position in which the seat and back unit is upright and a more rearward intermediate position partially tilted rearwardly from the horizonal,
a back link adapted for affixing to the chair back and pivotally connected at one point to the rear of said seat link member,
a bell crank having a fulcrum and two other pivoted connecting points spaced therefrom, a link pivotally connecting at one end to said fulcrum and at the other end to said base member, one of said other bell crank connecting points having a pivotal connection to said seat link member, and a connecting link pivotally connected at one end to said other one of said bell crank connecting points and at the other end to said back link at a point spaced from said one point, whereby pivotal movement of said back link about said one point concurrently pivotally moves said seat link member angularly relative to said base member and shifts the seat and back unit between the intermediate position and a fully reclined position in which the subtended angle between the seat link member and back link is substantially greater than in the other positions and the seat and back unit is reclined rearwardly at a greater angle than in said intermediate position.

4. A three-position fixture supporting the seat and back of a reclining chair, said fixture comprising:

a fixed base member adapted for affixing to the base of the chair and having a first fixed pivot and a second fixed pivot, a seat link member adapted for affixing to the seat and having a front seat pivot and a rear seat pivot, first and second front support links pivotally connected together near one of their ends and having their other ends pivotally connected to said front seat pivot and to first fixed pivot, respectively, a constraining link pivotally mounted intermediate its ends on said base member, a front control link pivotally connected between one end of said constraining link and said seat link member, a rear control link pivotally connected between the other end of said constraining link and said rear seat pivot, a rear support link pivotally connected between said second fixed pivot and said rear control link, said support links and said constraining link supportingly swinging said seat link member relative to said base member about said pivots between a normal forward generally horizontal position in which the seat and back unit is upright and a more rearward intermediate position partially tilted rearwardly from the horizontal, a back link adapted for affixing to the chair back and pivotally connected at one point to the rear of said seat link member, a bell crank having a fulcrum and two other pivoted connecting points spaced therefrom, a link pivotally connecting at one end to said fulcrum and at the other end to said base member, one of said other bell crank connecting points having a pivotal connection to said seat link member, and a connecting link pivotally connected at one end to said other one of said bell crank connecting points and at the other end to said back link at a point spaced from said one point, whereby pivotal movement of said back link about said one point concurrently pivotally moves said seat link member angularly relative to said base member and shifts the seat and back unit between the intermediate position and a fully reclined position in which the subtended angle between the seat link member and back link is substantially greater than in the other positions and the seat and back unit is reclined rearwardly at a greater angle than in said intermediate position.

5. A three-position fixture supporting the seat and back unit of a reclining chair, said fixture comprising:

a fixed base affixable to the base of the chair and having a first fixed pivot and a second fixed pivot, a seat link affixable to the chain seat and having a front seat pivot and a rear seat pivot, at least two front support links pivotally connected in series with the ends of said series pivotally connected to said first fixed pivot and to said front seat pivot, a rear support link with one end pivotally connected to said second pivot and the other end having means for establishing a pivoting connection to said rear seat pivot, said front and rear support links rotating about said base for translationally swinging said seat link longitudinally of said base between a normal, forward, substantially horizontal position in which the seat and back unit is upright and a more rearward intermediate position inclined from the horizontal, a constraining link pivotally mounted intermediate its ends on said base member, a front control link pivotally connected between one end of said constraining link and one of said front support links, a rear control link pivotally connected between the other end of said constraining link and said seat link, a back link affixable to the chair back and pivotally connected at one point to the rear of said seat link.

extensible link means pivotally connecting between another point on said back link, said seat link and said base for pivotally moving said seat link angularly relative to said base concurrently with pivotal motion of said seat link about said pivotal connection on the rear of said seat link after said seat and back unit is in the intermediate position to shift the seat and back unit between said intermediate position and a fully reclined position in which the subtended angle between the seat link and back link is substantially greater than in the other positions, and the seat and back unit is reclined rearwardly at a greater angle than in said intermediate position.

6. The reclining chair fixture as described in claim 5 wherein said extensible link means comprises:

a crank lever, means pivotally interconnecting one point on said lever and said base member to support said lever for rotation about said one point, means pivotally connecting a second point on said crank lever and said seat link, and means pivotally interconnecting a third point on said crank lever and said back link spaced from the pivotal connection to said seat link.

7. The chair fixture as described in claim 6 wherein said other end of said rear support link pivotally connects to an intermediate point on said rear control link.

8. In a reclining chair having a seat, a back and a leg rest supported by a fixture on a stationary base for movement between a normal upright position in which said seat and back are angularly disposed to subtend an upright seating angle with said seat generally horizontal and said leg rest retracted to said base, a fully reclined position in which said back is reclined rearwardly relative to said seat to subtend a substantially greater angle than said upright seating angle with said seat tilted rearwardly relative to said base and said leg rest extended ahead of and generally in line with said seat in a leg supporting position, and an intermediate position in which said seat and back are angularly disposed to subtend said normal upright seating angle with said seat positioned more rearwardly on said base than in said normal position and reclined relative to said base at an angle less than in said fully reclined position with said leg rest extended in said leg supporting relationship, said fixture comprising:

a base member affixable to the base, a seat link member affixable to the seat, front support linkage means pivotally connected to the forward end portions of said seat link and base members for pivotally interconnecting said members,
rear support linkage means pivotally interconnecting between connections to the rearward end portions of said seat link and base members.
constraining link means having a dead center position at said intermediate position for restricting movement of said seat link member on said support linkage means to translational motion relative to said base member between said normal and intermediate positions and permitting angular motion of said seat link member about said base member when past said dead center position between said intermediate and fully reclined positions,
said constraining link means pivotally interconnecting a point on said front support linkage means and at least one of said members to include said base member and establishing a fully constrained, pivotal, swinging motion of said seat link member with uninterrupted pivotal motion of said front support linkage means in moving said seat link member between said normal and fully reclined positions,
leg rest supporting link means affixable to the leg rest and pivotally connecting said leg rest to said front support link means and one of said members for movement of said leg rest between said retracted and forward leg supporting positions on relative motion between said front support link means and said one member,
a back link affixable to the back and pivotally connected at one point to the rear end portion of said seat link member,
and extensible link means pivotally interconnecting another point on said back link with said seat link member and with said base member for moving said seat link member angularly relative to said base member between the intermediate and fully reclined positions concurrently with pivotal motion of said back link about said seat link member.

9. The fixture described in claim 8 wherein said extensible link means comprises:
a crank lever,
means pivotally interconnecting one point on said crank lever and said base member,
means pivotally connecting a second point on said crank lever and said seat link member,
and means pivotally interconnecting a third point on said crank lever and said other point on said back link.

10. The fixture described in claim 9 wherein said front support linkage means comprises:
a first front support link pivotally connected at one end to the forward end portion of said seat link member,
a second front support link having a pivotal connection to the forward portion of said base member and means for pivotally interconnecting the other ends of said first and second front support links.

11. The fixture described in claim 10 wherein said rear support linkage means comprises a rear support link with one end connecting to means for establishing a pivotal connection to the rear portion of said seat link member and the other end having a pivotal connection to the rear portion of said base member.

12. The fixture described in claim 10 wherein said constraining link means is a link pivotally connected at one end to said base member and at the other end to one of said front support links.

13. The fixture described in claim 12 wherein said leg rest supporting link means comprises:
a leg rest link affixable to the leg rest,
a first leg rest extension link pivotally connected between said first front support link and an intermediate point on said leg rest link,
and a second leg rest extension link means for pivotally connecting a point of said leg rest link spaced from said intermediate point and the forward end portion of said seat link member.

14. The fixture described in claim 13 wherein said second leg rest extension link means comprises:
a third extension link pivotally connected at one end to an end of said leg rest link spaced from said one portion,
and a bell crank having its ends pivotally connected to said seat link member and to said first leg rest extension link and its fulcrum pivotally connected to said third extension link.

15. The fixture described in claim 13 wherein said second leg rest extension link means comprises:
a third extension link pivotally connected at one end to a point on said leg rest link spaced from the pivotal connection of said first leg rest extension link,
and a fourth extension link having one end pivotally connected to said seat link forward of the pivotal connection to said first front support link, its other end pivotally connected to the other end of said third extension link, and intermediate its ends pivotally connected to an intermediate point of said first leg rest extension link.

16. The fixture described in claim 10 wherein said constraining link means comprises:
a constraining link pivotally mounted intermediate its ends on said base member,
a front control link pivotally connected between one end of said constraining link and one of said front support links,
and a rear control link pivotally connected between the other end of said constraining link and the rear portion of said seat link member.

17. The fixture described in claim 16 wherein said rear support linkage means includes a link pivotally connected at one end to said base member and at the other end to said rear control link.

18. The fixture described in claim 16 wherein said leg rest supporting link means comprises:
a leg rest link adapted to be affixed to the leg rest and pivotally connected at one point to said front control link,
and a leg rest pivoting link pivotally connected to a front support link.

19. The fixture described in claim 16 wherein said rear support linkage means comprises a rear support link having pivotal connections to the rear portions of said seat link and base member.

20. In a reclining chair having a seat and a back supported by a fixture on a stationary base for movement between a normal upright position in which said seat and back are angularly disposed to subtend an upright seating angle with said seat generally horizontal, a fully reclined position in which said back is reclined rearwardly relative to said seat to subtend a substantially greater angle than said upright seating angle with said seat tilted rearwardly relative to said base, and an intermediate position in which said seat and back are angularly disposed to subtend said normal upright seating angle with said seat positioned more rearwardly on said base than in said normal position and reclined relative to said base at an angle less than in said fully reclined position, said fixture comprising:
a base member affixable to the base and having a first fixed pivot and a second fixed pivot,
a seat link member affixable to the seat and having a front seat pivot and a rear seat pivot,
at least two front support links pivotally connected in series with the ends of said series pivotally connected to said first fixed pivot and to said front seat pivot, respectively,
a rear support link with one end pivotally connected to said second pivot and the other end having means for establishing a pivoting connection to said rear seat pivot, constraining link means having a dead center position at said intermediate position for restricting movement of said seat link member on said support links to translational motion relative to said base member between said normal and intermediate positions and permitting angular motion of said seat link member about said base member when past said dead center position between said intermediate and fully reclined positions, said constraining link means pivotally interconnecting a point on said front support links and at least one of said members to include said base member and establishing a fully constrained, pivotal swinging motion of said seat link member with uninterrupted pivotal motion of said front support links in moving said seat link member between said normal and fully reclined positions, a back link affixable to the back and pivotally connected at one point to the rear end portion of said seat link member, and extensible link means pivotally interconnecting another point on said back link with said seat link member and with said base member for moving said seat link member angularly relative to said base member between the intermediate and fully reclined positions concurrently with pivotal motion of said back link about said seat link member.

21. The fixture described in claim 20 wherein said extensible link means comprises a crank lever, means pivotally interconnecting one point on said crank lever and said base member, means pivotally connecting a second point on said crank lever and said seat link member, and means pivotally interconnecting a third point on said crank lever and another point on said back link.

22. The fixture as described in claim 21 wherein said constraining link means is a link having one end pivotally connected to said base member intermediate said first and second fixed pivots.

23. In a reclining chair having a seat, a back and a leg rest supported by a fixture on a stationary base for movement between a normal upright position in which said seat and back are angularly disposed to subtend an upright seating angle with said seat generally horizontal and said leg rest retracted to said base, a fully reclined position in which said back is reclined rearwardly relative to said seat to subtend a substantially greater angle than said upright seating angle with said seat tilted rearwardly relative to said base and said leg rest extended ahead of and generally in line with said seat in a leg supporting position, and an intermediate position in which said seat and back are angularly disposed to subtend said normal upright seating angle with said seat rearwardly reclined relative to said base at an angle less than in said fully reclined position and said leg rest extended in said leg supporting relationship, said fixture comprising:

a base member affixable to the base, a seat link member affixable to the seat, a first front support link pivotally connected at one end to the forward end portion of said seat link member, a second front support link pivotally connected to the front portion of said base and to the other end portion of said first support link, a rear support link pivotally connected at one end to the rear end portion of said seat link member and at the other end of the rear end portion of said base member, a constraining link pivotally connected at one end to said base member and at the other end to an intermediate point on one of said front support links to establish a fully constrained, pivotal, swinging motion of said seat link member and continuous pivotal motion of said support links while moving between said normal and fully reclined positions, a leg rest supporting link means affixable to the leg rest and pivotally connecting said leg rest with said support links and one of said members for movement of said leg rest between said retracted and forward leg supporting positions on relative motion between said front support links and said one member, a back link affixable to the back and pivotally connected to the rear end portion of said seat link member, a bell crank pivotally connected to said seat link member at one point, a link pivotally connected to a second point on said bell crank and to said base member to support said bell crank for rotational movement about said one point and a connecting link having one end pivotally connected to said back link below its pivotal connection to said back link and the other end connected to a third point on said bell crank, whereby the movement of said back link relative to said seat link member transmitted through said bell crank and connecting links pivotally moves said seat link member angularly relative to said base member concurrently with the pivoting motion of said back link in moving between the intermediate and fully reclined positions.

References Cited by the Examiner

UNITED STATES PATENTS

| 3,044,827 | 7/1962 | Belisle | 297—89 |
| 3,069,201 | 12/1962 | Belisle et al. | 297—85 |
| 3,093,408 | 6/1963 | Fletcher | 297—322 X |
| 3,128,122 | 4/1964 | Mizelle | 297—88 X |
| 3,163,464 | 12/1964 | Martin et al. | 297—85 |
| 3,166,353 | 1/1965 | Re | 297—83 |
| 3,169,794 | 2/1965 | Fletcher | 297—322 |
| 3,172,697 | 3/1965 | Fletcher | 297—85 |
| 3,185,520 | 5/1965 | Rosmarin | 297—322 X |

FRANK B. SHERRY, *Primary Examiner.*

JAMES T. McCALL, *Examiner.*